United States Patent [19]
Osgood

[11] 3,780,377
[45] Dec. 18, 1973

[54] MAGNETIC CARD READER-RECORDER APPARATUS WITH PROVISION FOR AVOIDING UNDESIRED ERASURES

[75] Inventor: Richard B. Osgood, Los Altos, Calif.

[73] Assignee: Hewlett-Packard Company, Palo Alto, Calif.

[22] Filed: May 4, 1972

[21] Appl. No.: 250,401

Related U.S. Application Data

[63] Continuation of Ser. No. 137,643, April 26, 1971, abandoned, which is a continuation of Ser. No. 749,078, July 31, 1968, abandoned.

[52] U.S. Cl. 346/74 M, 179/100.2 D, 235/61.11 D, 235/61.11 E, 274/4 J

[51] Int. Cl. .......... G11b 15/04

[58] Field of Search .......... 346/74 M; 179/100.2 D; 340/174.1 B; 235/61.11 D, 61.11 E, 61.12 R, 61.11 A; 271/52, 59; 274/4 H, 4 J, 4 G

[56] References Cited

UNITED STATES PATENTS

| | | | |
|---|---|---|---|
| 3,494,525 | 2/1970 | Wiig | 226/11 |
| 3,511,975 | 5/1970 | Blair et al. | 235/61.11 |
| 3,552,751 | 1/1971 | Kelso | 274/4 |
| 3,560,717 | 2/1971 | Patterson | 235/61.11 |

*Primary Examiner*—Paul J. Henon
*Assistant Examiner*—James D. Thomas
*Attorney*—Roland I. Griffin

[57] ABSTRACT

A magnetic card containing important informational data that is to be preserved is physically altered by, for example, clipping one of its corners. This physical change in a card located in the operational position for recording or reading is detected by a sensor, which thereupon disables the recording mechanism to prevent inadvertent obliteration of the important informational data contained on the card. A linear guide fixed with respect to a magnetic recording head aligns the card as the card is driven past the recording head by a cylindrical capstan. This cylindrical capstan is angled slightly with respect to the end edges of the rectangular card in the plane of the card so as to apply a lateral force component to the card and thus hold it against the linear guide.

1 Claim, 1 Drawing Figure

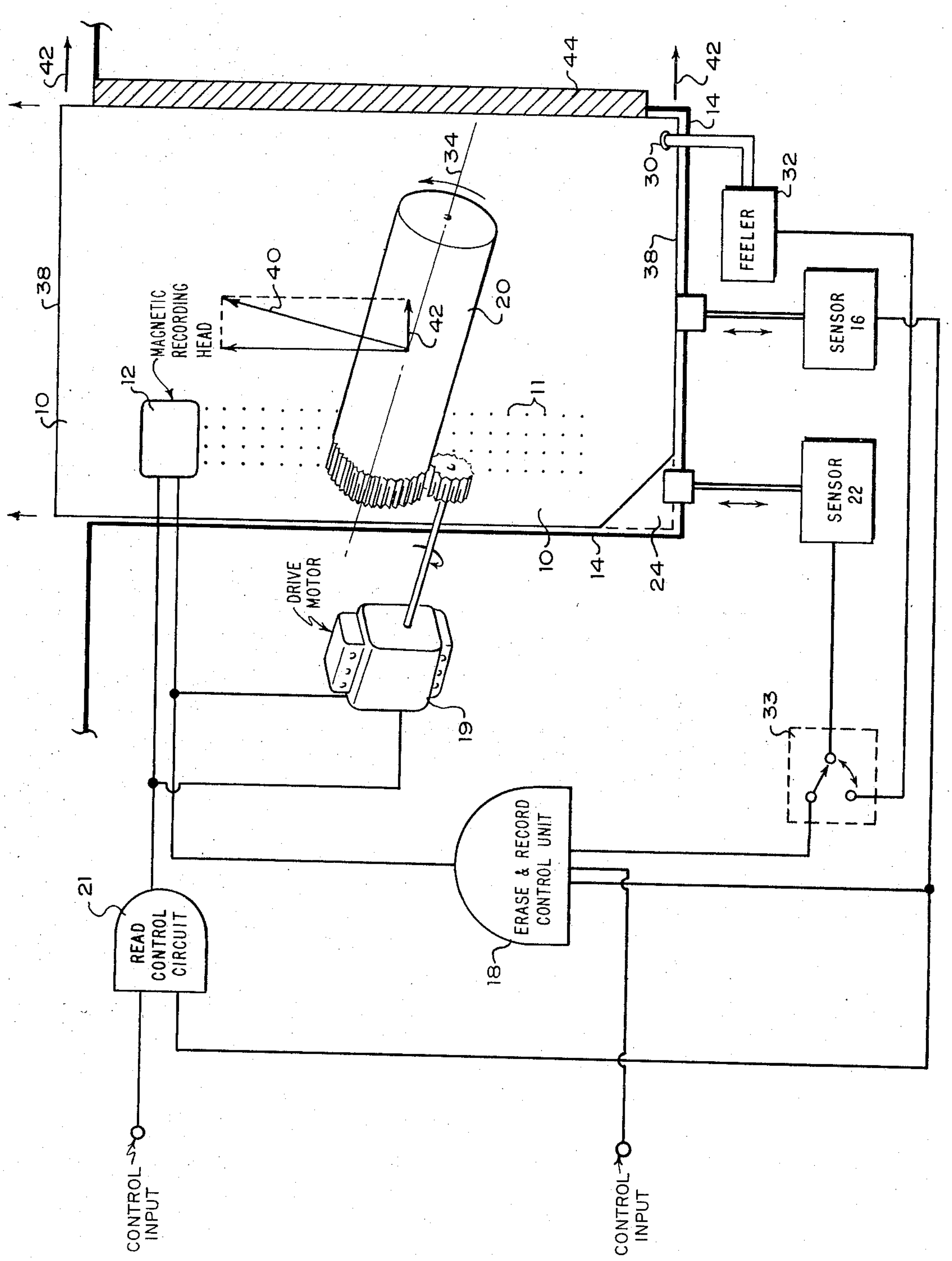
INVENTOR
RICHARD B. OSGOOD
BY Roland D. Griffin
ATTORNEY

MAGNETIC CARD READER-RECORDER APPARATUS WITH PROVISION FOR AVOIDING UNDESIRED ERASURES

This is a continuation of application Ser. No. 137,643, filed Apr. 26, 1971, which was a continuation of application Ser. No. 749,078, filed July 31, 1968.

The parent application, Ser. No. 749,078, filed July 31, 1968, was abandoned in favor of continuation application, Ser. No. 137,643, filed Apr. 26, 1971, and abandoned in favor of this continuation application.

BACKGROUND AND SUMMARY OF THE INVENTION

Unlike printed or hole-punched information, magnetically recorded information is not visible on the recording medium. Since the existence or importance of the recorded information cannot be readily determined, a method of avoiding its inadvertent obliteration is desirable.

According to the preferred embodiment of the invention, a card upon which important informational data has been recorded is physically changed by, for example, clipping one of its corners. The magnetic reader-recorder apparatus is provided with a sensor for determining whether a card in position for any operation that will obliterate its information has been physically changed in this manner. Upon detection of such a physical change, the sensor will disable the record or erase mechanism through a gate circuit thus preventing obliteration of vital information.

Since magnetically recorded information is not visible, it is also desirable to provide some sort of alignment so that the recording and reading of informational data always take place along the same path on the card. This is especially important where digital "bits" of information are recorded on the card, as for example from a computer or calculator. The misalignment of a single recorded "bit" may throw off the reading of a whole line of data on the magnetic card. Since the same cards may be read or recorded by different magnetic recording machines, it is also desirable to provide alignment so that recording will take place along the same path on every card in every recording machine.

According to the preferred embodiment of the invention, this card alignment is provided by the application of a transverse force during reading or recording to hold an edge of the card against a linear guide which is fixed with respect to the magnetic recording head. This force is provided by slightly angling the axis of the friction drive capstan with respect to the end edges of the rectangular card in a plane parallel to the plane of the card. The card is thus moved across the recording head along a linear path that is substantially uniform for every card and every recording apparatus.

DESCRIPTION OF THE PREFERRED EMBODIMENT

Referring now to the drawing, which is a simplified representation of the preferred embodiment of the invention, there is shown a card 10 of magnetic recording material located in operational position in the reader-recorder apparatus. Informational data, which would normally be invisible but is shown for illustrative purposes as "bits" 11, was previously recorded on card 10 by magnetic recording head 12. To erase this information and/or to record new information, card 10 is placed in the operational position at the rear of frame

14. Sensor 16, which may be a microswitch, detects the presence of card 10 in this operational position and supplies a signal to one input of gate control unit 18. Control unit 18 may comprise an AND gate that is responsive to the application of signals at all three of its inputs to supply an output signal for enabling card drive motor 19 and the recording or erasing mechanism of recording head 12. Since control unit 18 is an AND gate, the absence of a signal from sensor 16 will disable the recording or erasing mechanism of recording head 12. Sensor 16 is also connected to a read control circuit 21 for disabling the card reading mechanism unless a card is in the operational position at the rear of frame 14. Operation of recording head 12 in a read or erase and record mode is determined by selective application of a control signal to an input of the appropriate control unit 21 or 18.

Since the information which may be stored on magnetic recording card 10 is invisible, it is desirable to provide a method of avoiding the inadvertent obliteration of important information recorded thereon. This is accomplished by physically altering the card by, for example, clipping one of its corners and by providing means for detecting this physical alteration of the card and, upon its detection, disabling the recording or erasing mechanism of the apparatus through a gate control unit.

Sensor 22 is disposed to be normally activated by corner 24 of recording card 10 when the card is in operational position for a recording or erasing operation. If the corner 24 of a card 10 in the operational position has been removed, its absence will be detected by sensor 22. Therefore, gate control unit 18 will disable the magnetic recording or erasing mechanism of recording head 12 thereby preventing inadvertent obliteration of the informational data recorded on the card. Any erasing of or recording over the information on such a physically altered card can therefore be prevented by clipping the corner of the card.

Alternatively, card 10 may be physically altered by punching a hole 30 through it. Switch 33 is then actuated to connect feeler 32 with control unit 18 in place of sensor 22. Upon detection of hole 30 in the card by a feeler 32, the recording mechanism is disabled by gate control unit 18 so the information on card 10 will not be obliterated.

Activation of motor 19 drives friction capstan 20 to move card 10 in a straight line across recording head 12 where recording or reading operations are performed. As previously shown, magnetic recording of information on cards for use in several different machines or for more than a single use in the same machine requires accurate placement of the card recording area beneath the recording head. This alignment is provided by holding the card firmly against a linear guide as the card is moved past a magnetic recording head. The axis 34 of friction capstan 20 is therefore angled to make a small acute angle with rectangular card edges 38, while axis 34 is in a plane parallel to the plane of card 10. The force, as illustrated by force vector 40, applied to card 10 to move it across recording head 12 thus has a component illustrated by force vector 42 which is applied laterally in a direction perpendicular to the linear path of the card and parallel with the plane of card 10. Card 10 is thus held firmly against and moved along linear guide 44 of frame 14 as card 10 moves along a linear path across magnetic recording head 12.

I claim:

1. Magnetic card reader-recorder apparatus comprising:

recording means, including at least one magnetic recording head, for recording informational data on a magnetic recording card;

receiving means, including a driving and guiding mechanism, for receiving the magnetic recording card and locating it in an operational position and for moving the magnetic recording card along a path in close proximity to the magnetic recording head;

first detecting means, including a first sensor, for detecting the leading edge of the magnetic recording card when the magnetic recording card is in the operational position;

second detecting means, including a second sensor, for detecting the absence of a portion of the leading part of the magnetic recording card when the magnetic recording card is in the operational position; and control means, coupled to the first and second detecting means and to the recording means, for disabling the recording means in response to detection of the leading edge and the absence of a portion of the leading part of the magnetic recording card by the first and second detecting means to prevent unintentional obliteration of the informational data on the magnetic recording card.

* * * * *